United States Patent [19]

Stillwagon

[11] Patent Number: 4,458,910
[45] Date of Patent: Jul. 10, 1984

[54] FOOT RETAINER
[76] Inventor: Steven R. Stillwagon, 1541 18th St., Manhattan Beach, Calif. 90266
[21] Appl. No.: 427,544
[22] Filed: Sep. 29, 1982
[51] Int. Cl.³ ............................................. B62J 25/00
[52] U.S. Cl. .................................. 280/291; 74/594.6; 296/75
[58] Field of Search ............... 280/163, 291; 296/75; 74/594.6, 594.4

[56] References Cited
U.S. PATENT DOCUMENTS
493,696 3/1893 Ferguson .......................... 74/594.6

FOREIGN PATENT DOCUMENTS
180208 11/1954 Austria ............................... 280/291
439790 5/1927 Fed. Rep. of Germany ...... 280/291
1571 of 1910 United Kingdom ............... 74/594.6

Primary Examiner—Joseph F. Peters, Jr.
Assistant Examiner—D. Lynn Fugate
Attorney, Agent, or Firm—Roger A. Marrs

[57] ABSTRACT

A foot retainer is disclosed herein supporting a passenger's feet on a motorcycle having a support roller pivotally attached to the motorcycle frame and a guide roller rotatably carried on the support roller defining an access space therebetween for accommodating the passenger's feet. Limit stops are operably carried on the support roller cooperating with a connecting bar for permitting rotation of the guide roller without a preselected arcuate angle.

3 Claims, 3 Drawing Figures

U.S. Patent — Jul. 10, 1984 — 4,458,910
FIG. 1
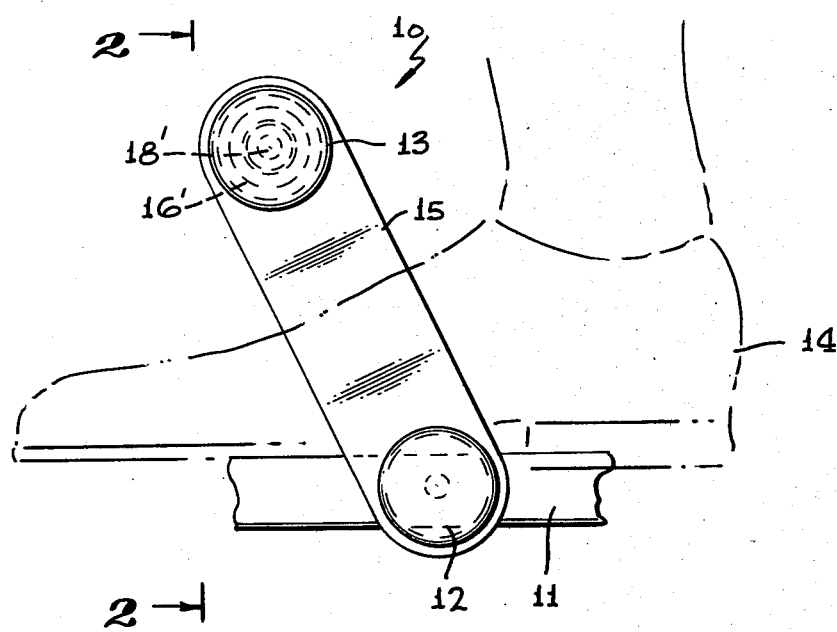
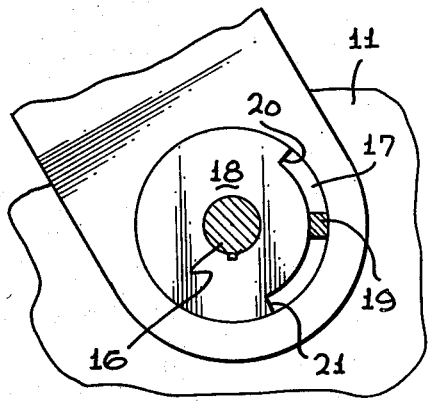
FIG. 3
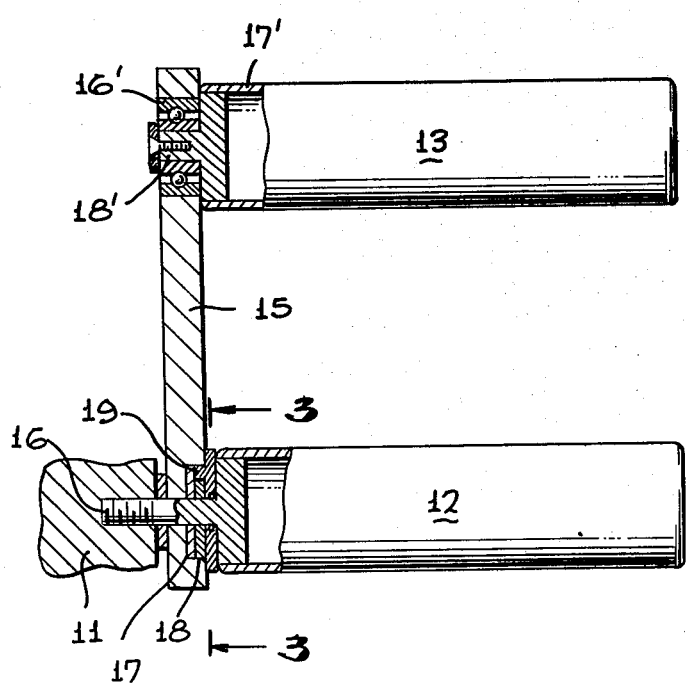
FIG. 2

FOOT RETAINER

BACKGROUND OF THE INVENTION

1. Field of the Invention

The present invention relates to foot retainers and more particularly to a novel device for supporting the feet of a passenger on a two wheeled vehicle with comfort and safety.

2. Brief Description of the Prior Art

In the past, passengers on two wheeled vehicles such as motorcycles generally place their feet on portions of the vehicle frame for support while driving on a roadway. In some instances, foot supports have been pivotally incorporated into the frame behind the seat of the driver at about axle level on which the passenger's feet may be stationed. Although such attempts have been succesful for providing the support for the feet, nothing is provided for guiding the passenger's feet on to the support and there is a lack of retention on the foot itself which would give the passenger a feeling of stability and confidence. Although some prior attempts have included a boot-type retainer, such have been proven to be unsafe in the event the passenger should fall or desire to rapidly put his feet on the ground such as at a stop sign. Under such circumstances, the passenger has difficulty in extracting his feet from the boot in a rapid and natural manner.

Therefore, a long standing need has existed to provide a foot guide and retaining means on the frame of a motorcycle or other two wheeled vehicle which will readily guide and support the feet of a passenger during travel on the vehicle. The support and guide means must be capable of providing safety to the passenger so that the feet may be readily removed or dislodged in an emergency situation without danger to the limbs of the passenger.

SUMMARY OF THE INVENTION

Accordingly, the above problems and difficulties are obviated by the present invention which provides a novel foot retainer and guide means incorporating a pair of rollers connected together at one end by a connecting bar so that a space is defined therebetween adapted to insertedly receive the foot of a passenger. The opposite end of the rollers from their respective ends connected to the connecting bar is open and a selected one of the rollers is established as a support member on which the passenger's foot rests while the other roller is established as a guide and retainer roller adapted to engage with the top of the passenger's foot. Each of the rollers are rotatably carried on the shafts which are connected to the connecting bar while the shaft of the support roller also connects with the frame of the vehicle. Means are provided between the connecting bar and the support roller for permitting limited rotational movement of the guide and retaining roller with respect to the support roller.

Therefore, it is among the primary objects of the present invention to provide a novel foot guide and retaining means for two wheeled vehicles which will readily support the feet of a passenger and which will guide the feet of the passenger onto the supporting means.

Another object of the present invention is to provide a novel foot guide and support means which incorporates safety features whereby a passenger's feet positioned into the device will readily detach or dislodge from the device without difficulty or injury to the passenger of a two wheeled vehicle.

Another object of the present invention resides in the provision of a foot support and guide member adapted to insertably receive the foot of a passenger on a two wheeled vehicle whereby the guide portion of the device presents limited movement and wherein the device incorporates safety features permitting withdrawal of the passenger's feet in a convenient and unobstructed manner.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following descriptions, taken in connection with the accompanying drawings in which:

FIG. 1 is a side elevational view of the novel foot guide and retaining means of the present invention;

FIG. 2 is a front elevational view, partly in section, of the device shown in FIG. 1 as taken in the direction of arrows 2—2 thereof; and FIG. 3 is a transverse cross-sectional view of the support roller employed in the device in FIG. 2 as taken in the direction of arrows 3—3 thereof.

DESCRIPTION OF THE PREFERRED EMBODIMENT

Referring to FIG. 1, the frame of a conventional two wheeled vehicle such as a motorcycle for example is indicated by the numeral 11 and a persons foot is indicated by the numeral 14. The purpose of the present invention is to support the foot 11 of a passenger on the vehicle as well as to guide the foot into position on a supporting member 12 which takes the form of a roller. A second roller 13 serves as a guide and retaining roller for the foot 14 when it is initially inserted into a space defined between the pair of rollers. The end of the rollers 12 and 13 are connected together by means of a connecting bar 15 and connection is effected by means of shafts 16 and 18'.

Referring now in more detail to FIG. 2, it can be seen that a bearing 16' rotatably carries the shaft 18 of the roller 13 on the end of connecting bar 15. Therefore, the roller 13 will rotate with respect to the connecting bar 15. Also, the exterior surface of the roller 13 may be provided with a cushion material 17'.

The roller 12 may also be covered with the same type of material and includes the shaft 16 which is fixed to the frame 11 so that no rotation takes place. The shaft 16 is mounted through a washer 17 and a limited stop means taking the form of disks 18 and 19. To be described later.

It is to be particularly noted that the rollers 12 and 13 are connected at one end to the opposite ends of the connecting bar 15 respectively so as to define a space therebetween which is open at the opposite end of the rollers from their end connected to the bar 15. Thus, a safety feature is established whereby the person's foot 14 may be introduced or withdrawn from the device laterally from the open side or forwardly between the rollers.

Referring now in detail to FIG. 3, the rotational limitation means is more clearly illustrated in which the disk 18 includes spaced apart fixed shoulders 20 and 21. Disk 19 includes a projection which is disposed over the curved portion of the disk 18 and is intended to move between the shoulders 20 and 21. Therefore, the connecting bar 15 can be moved within the limits of engagement of the projection 19 with the shoulders 20 or 21. Such limited movement assists guiding of the persons foot into the device and also withdrawing the foot therefrom.

In view of the foregoing, it can be seen that the novel device of the present invention provides a foot support and foot retention means for the passenger of a two wheeled vehicle which is convenient to use and represents a high degree of safety in use. The passenger merely places the toe of his foot 14 into the space between the rollers 12 and 13 and due to the limited movement of the roller 13 via the connecting bar 15, the user's foot can be accomodated into a proper supporting position on the roller 12.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A foot guide and retaining apparatus comprising:
   a two-wheeled vehicle having a frame for supporting a passenger;
   a support roller carried on said frame;
   a guide roller in fixed spaced apart, parallel relationship with respect to said support roller defining a space therebetween for insertably receiving a foot of the passenger;
   a connection bar having its opposite ends pivotally connected to the respective ends of said rollers; and
   limit means operably coupled between said connection bar and said support roller for permitting limited rotational movement therebetween.

2. The invention as defined in claim 1 wherein:
   said limiting means includes a pair of discs;
   one disc having an arcuate cut-out terminating at its opposite ends in shoulder stops; and
   said other disc of said pair having an outwardly extending projection occupying said cut-out and movable between said stops.

3. The invention as defined in claim 2 wherein:
   each of said rollers having a covering thereover.

* * * * *